Figure 1:
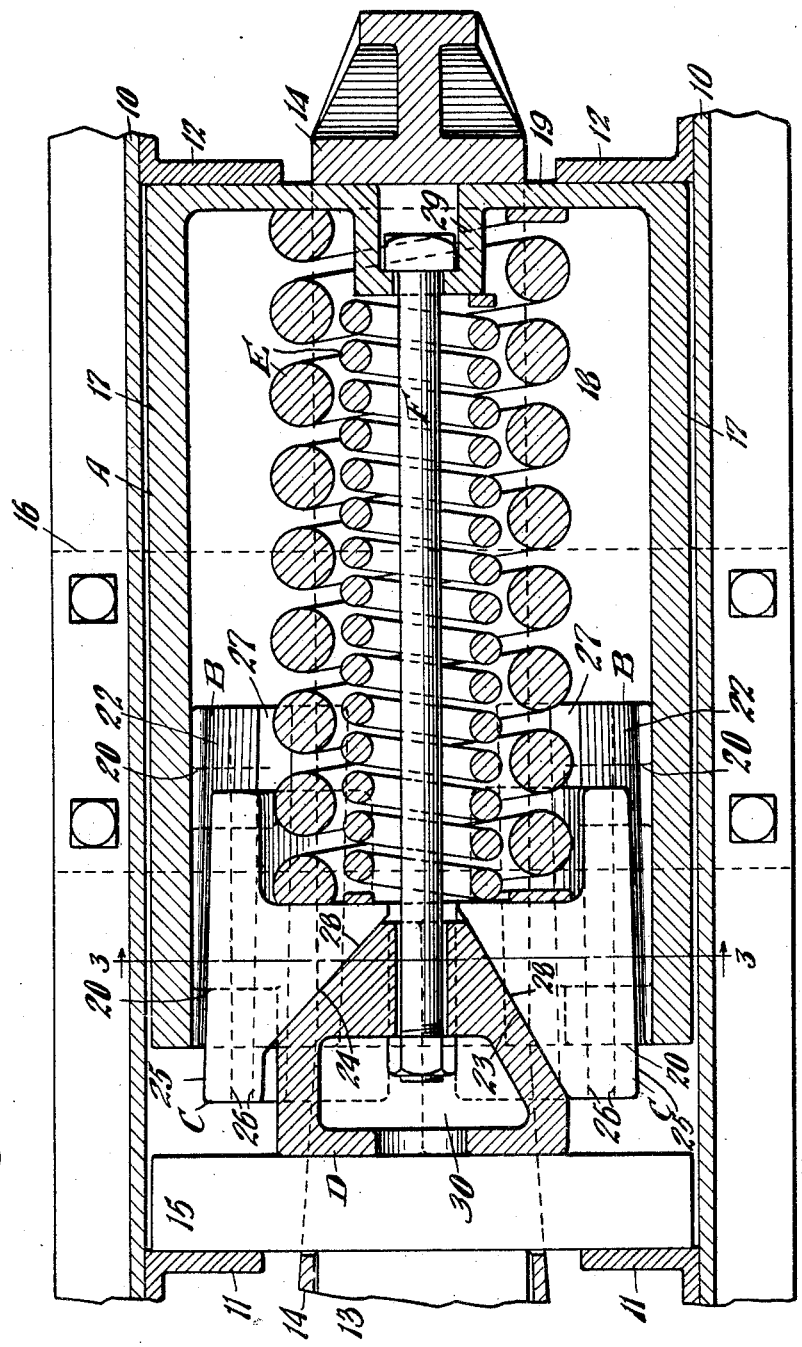

Dec. 11, 1928.

J. F. O'CONNOR 1,694,793

FRICTION SHOCK ABSORBING MECHANISM

Filed April 22, 1927    2 Sheets-Sheet 1

Witness
Wm. Geiger

Inventor
John F. O'Connor
By George I. Haight
His Atty.

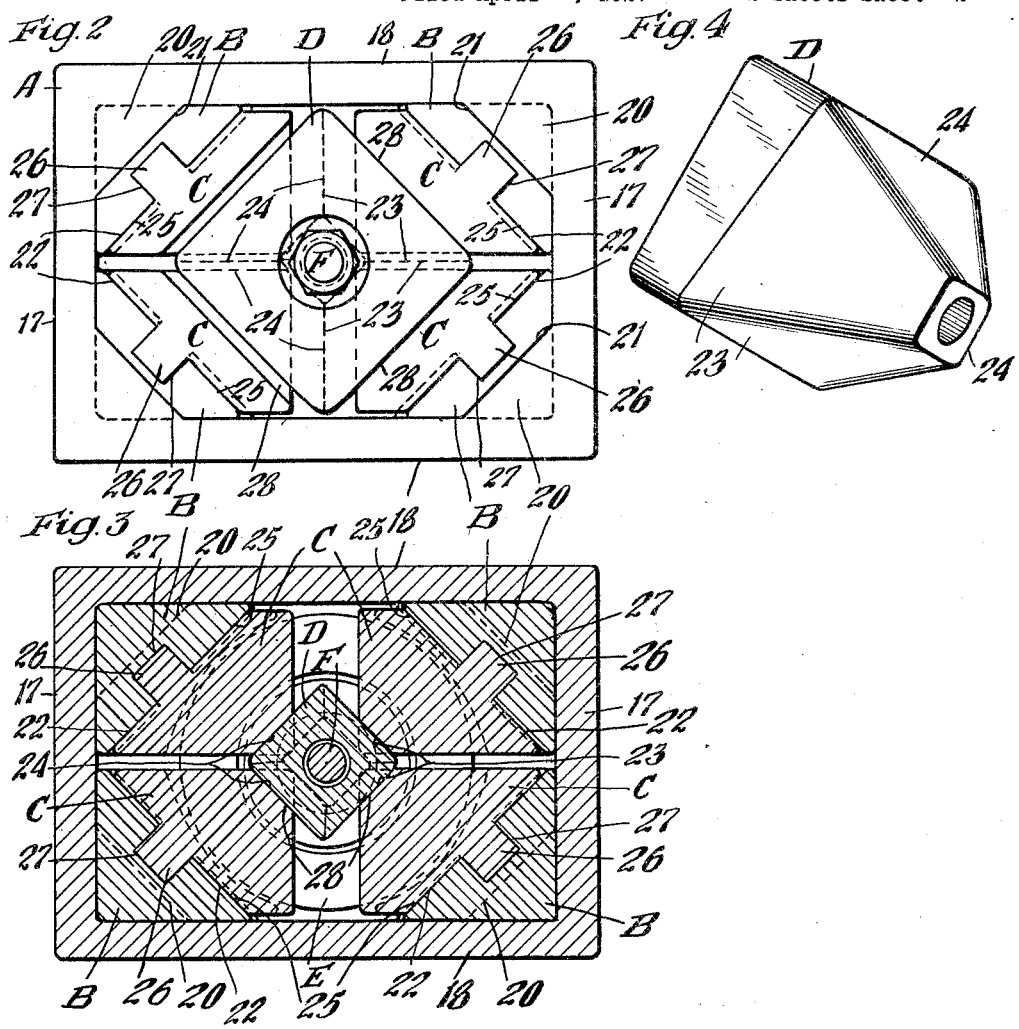

Patented Dec. 11, 1928.

1,694,793

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed April 22, 1927. Serial No. 185,889.

This invention relates to improvements in friction shock absorbing mechanisms.

One object of the invention is to provide a friction shock absorbing mechanism especially adapted for railway draft riggings, including a rectangular friction shell having means co-operating therewith so designed that wear of the shell proper is substantially eliminated.

A more specific object of the invention is to provide a friction shock absorbing mechanism, including a rectangular shell or cage provided with liners in diagonally opposed corners thereof presenting flat opposed friction surfaces, four friction shoes co-operating with the liners and a wedge having engagement with the four shoes, wherein the shoes and liners have inter-engaging guide means to limit the shoes to movement longitudinally of the mechanism, thereby preventing engagement of the friction means with the walls of the cage, thus eliminating wear of the walls and adding greatly to the life of the gear.

Other objects and advantages of the invention will more fully and clearly appear from the descriptions and claims hereinafter following.

In the drawings, forming a part of this specification, Figure 1 is a horizontal longitudinal sectional view of a portion of a railway draft rigging showing my improvements in connection therewith. Figure 2 is a front end elevational view of the shock absorbing mechanism proper. Figure 3 is a vertical transverse sectional view corresponding substantially to the line 3—3 of Figure 1. And Figure 4 is a detailed perspective view of a wedge member employed in connection with my improved shock absorbing mechanism.

In said drawings, 10—10 indicate channel-shaped center or draft sills of a railway car underframe, to the inner sides of which are secured front stop lugs 11—11 and rear stop lugs 12—12, of the usual form. The inner end of the drawbar is indicated by 13 to which is operatively secured a yoke 14 of well known form. The shock absorbing mechanism proper and a front main follower 15 are disposed within the yoke. The yoke and the parts therewithin are supported in operative position by a detachable saddle plate 16 fixed to the draft sills.

The improved shock absorbing mechanism proper comprises broadly: A spring cage A; four liners B—B; four friction shoes C—C; a wedge block D; a main spring resistance E; and a retainer bolt F.

The spring cage A is in the form of a substantially rectangular box-like casting having spaced longitudinally disposed side walls 17—17, spaced longitudinally disposed horizontal top and bottom walls 18—18 and a transverse rear end wall 19. The end wall 19 co-operates with the stop lugs 12 in the manner of the usual rear follower. At the forward end, the cage A is provided on diagonally opposite corners with ribs 20—20 for a purpose hereinafter described.

The liners B which are four in number are arranged in sets at diagonally opposed corners of the cage. The liners are all of similar design, each being in the form of a relatively thick plate having cut away portions 21—21, adapted to receive the corresponding ribs 20 in the corner of the cage A. It will be evident that by inter-engagement of the ribs 20 of the cage with the cut away portions 21 of the liners, the latter are held against longitudinal movement with respect to the cage. On the inner side, each liner is provided with a longitudinally disposed flat friction surface 22, the friction surfaces 22 being preferably converged inwardly of the mechanism.

The wedge block D has a flat front end face bearing directly on the main follower 15. At the inner side, the wedge block D is provided with four inwardly converging wedge faces, the faces being symmetrically arranged about the longitudinal axis of the wedge. The four faces of the wedge comprise a set 23—23 disposed at a relatively keen wedge acting angle with respect to the longitudinal axis of the mechanism and a set 24—24 disposed at a relatively blunt releasing angle to said axis. As clearly shown in Figures 2, 3 and 4 of the drawings, two faces 23 are arranged on one side of the mechanism and the two faces 24 on the other side of the same.

The friction shoes C which are four in number, are interposed between the four wedge faces of the block D and the four liners respectively. The four shoes are of similar design except as hereinafter pointed out. Each shoe is provided with an outer longitudinally disposed flat friction surface 25 co-operating with the friction surface 22 of the corresponding liner B. On the outer side, each shoe is also provided with a longitudinally disposed rib 26 engaged within a groove 27 of the liner, thereby limiting the shoe to longitudinal movement with respect to the mechanism and preventing lateral displacement of the same, thereby holding the outer edge of the shoe spaced from the adjacent wall of the cage A. As clearly shown in Figure 2, the top and bottom sets of shoes are spaced slightly from the top and bottom walls of the cage A to prevent contact of the shoes with the walls. On the inner side, each shoe is provided with a flat wedge face 28 adapted to co-operate with one of the wedge faces of the wedge block D. The shoes C at one side of the mechanism are provided with relatively keen wedge faces adapted to co-operate with the wedge faces 23 of the wedge block, and the two shoes at the other side of the mechanism are provided with relatively blunt faces adapted to co-operate with the wedge faces 24 of said block.

The spring resistance E comprises an inner relatively light coil and an outer heavier coil, the two coils having their front ends bearing directly on the inner ends of the friction shoes and the outer coil having the rear end thereof bearing on the end wall 19 of the cage A. The inner coil has the rear end thereof bearing on a hollow boss 29 projecting inwardly from the end wall 19.

The mechanism is held assembled and of uniform overall length by the retainer bolt F which has its opposite ends anchored to the cage A and the wedge block D respectively, the head of the bolt being disposed within the hollow boss 29 of the cage and the nut of the bolt being accommodated within an opening 30 in the wedge block D. The retainer bolt not only serves to hold the mechanism assembled, but is also utilized to maintain the spring resistance E under initial compression. Compensation for wear of the various friction and wedge faces is had by the expansive action of the main spring resistance which tends to force the friction shoes outwardly.

The operation of my improved shock absorbing mechanism assuming a compression stroke, is as follows: The main follower 15 and the spring cage A will be moved relatively toward each other, thereby forcing the wedge and the friction shoes inwardly of the cage against the resistance of the main spring E, at the same time spreading the shoes apart so as to force them into intimate contact with the friction surfaces of the liners. Relative approach of the spring cage and follower 15 will continue either until the actuating force is reduced, or inward movement of the follower is limited by engagement with the front end of the cage, whereupon the actuating force will be transmitted directly through the cage, the latter acting as a column load transmitting member, preventing the spring resistance E from being unduly compressed. During release, expansive action of the spring E will return all of the parts to normal position, outward movement of the wedge being limited by the retainer bolt and the wedge in turn limiting outward movement of the shoes.

From the preceding description taken in connection with the drawings, it will be evident that due to the shoes being urged laterally outwardly by the wedge and the main spring which is under initial compression, the liners will be maintained anchored to the side walls of the cage A. It will further be evident that due to the diagonal arrangement of the wedge faces of the friction shoes, vertical displacement of the wedge block is positively prevented and due to the interengaging means on the shoes and liners, the shoes are limited to longitudinal movement, thereby preventing engagement of the top and bottom walls of the cage by the friction means of the mechanism, and entirely eliminating wear of these walls, thus adding greatly to the life of the gear.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a rectangular spring cage open at one end; of liners disposed in diagonally opposed corners of the cage at the open end thereof; sets of opposed friction shoes co-operating with the liners; a wedge block having a plurality of wedge faces, one of which co-operates with each shoe; and spring resistance means within the cage opposing inward movement of the shoes.

2. In a friction shock absorbing mechanism, the combination with a rectangular spring cage; of liners disposed in diagonally opposed corners thereof; opposed friction shoes co-operating with the liners, said shoes and liners having interengaging means thereon for limiting movement of the shoes to a direction longitudinally of the cage and holding the shoes spaced from the walls of the cage; a wedge co-operating with the shoes; and spring resistance means within the cage opposing inward movement of the shoes.

3. In a friction shock absorbing mechanism, the combination with a rectangular spring cage having a friction shell section at one end thereof; of a liner disposed at each corner of the friction shell section, said liners being arranged in opposed sets and each liner having a longitudinally disposed friction surface; a friction shoe co-operating with each liner; a wedge engaging the shoes, said wedge being provided with four wedge faces, one face for each shoe; and spring resistance means within the cage opposing movement of the shoes inwardly.

4. In a friction shock absorbing mechanism, the combination with a rectangular spring cage; of liners disposed in diagonally opposite corners thereof, each of said liners being provided with a longitudinally disposed groove on the inner side thereof; opposed friction shoes co-operating with the liners, each of said shoes having a longitudinally disposed rib engaging within the groove of the corresponding liner and guided thereby, said shoes being held in spaced relation to the top, bottom, and side walls of the cage by said interengaging ribs and grooves; a wedge co-operating with the shoes; and spring resistance means within the cage and opposing inward movement of the shoes.

In witness that I claim the foregoing I have hereunto subscribed my name this 18th day of April, 1927.

JOHN F. O'CONNOR.